United States Patent [19]

Austin et al.

[11] Patent Number: 5,180,797
[45] Date of Patent: Jan. 19, 1993

[54] PROCESS FOR CONVERTING POLYKETONES TO POLYESTERS WITH ORGANIC PEROXY ACID

[75] Inventors: Richard G. Austin, Kingwood; Tad L. Patton, Baytown, both of Tex.

[73] Assignee: Exxon Chemical Patents Inc., Linden, N.J.

[21] Appl. No.: 633,351

[22] Filed: Dec. 27, 1990

[51] Int. Cl.$^5$ .............................................. C08G 67/02
[52] U.S. Cl. .................................... 525/539; 528/392
[58] Field of Search ......................................... 525/539

[56] References Cited

U.S. PATENT DOCUMENTS

| | | |
|---|---|---|
| 4,192,942 | 3/1990 | Mainord . |
| 4,929,711 | 5/1990 | Chang et al. ........................ 525/539 |
| 4,957,997 | 9/1990 | Chang et al. ........................ 528/220 |

FOREIGN PATENT DOCUMENTS 372602  6/1990  European Pat. Off. .

OTHER PUBLICATIONS

"Free-Radical Ring Opening Polymerization" by William J. Bailey et al., in *J. Macromol. Sci.-Chem.*, A21(13 & 14), pp. 1611-1639 (1984) describes free-radical ring opening polymerizations of heterocyclic compounds.
"Synthesis of Biodegradable Polyethylene" by William J. Bailey and Benjamin Gapud, in *Polymer Stabilization and Degradation*, based on a symposium sponsored by the Division of Polymer Chemistry at the 187th Meeting of the American Chemical Society, St. Louis, Mo., Apr. 9-12, 1984, Peter P. Klemchuk, Ed., pp. 423-431 (1985) describes forming biodegradable copolymers of ethylene and 2-methylene-1, 3-dioxepane by free radical polymerization.
"Synthesis of Functionally-Terminated Oligomers by Free Radical Ring-Opening Polymerization" by William J. Bailey in *J. Macromol. Sci.-Chem.*, A21(8 & 9), pp. 979-995 (1984).
"The Use of Free Radical Ring-Opening Polymerization for the Synthesis of Reactive Oligomers" by William J. Bailey, et al. in *Am. Chem. Soc. Div. Poly. Chem. Preprints*, 25 (1) 142 (1984).
"Baeyer-Villiger Reaction in the Solid State" by Fumio Toda, Minoru Yagi, and Koji Kiyoshige in *J. Chem. Soc., Chem. Commun.*, 1988 pp. 958-959.

*Primary Examiner*—Harold D. Anderson
*Attorney, Agent, or Firm*—Catherine L. Bell; Myron B. Kurtzman

[57] ABSTRACT

A polyketone having a molecular weight greater than 1,000 and containing 0.01 to 50 mole percent carbonyl groups is contacted directly with an organic peroxyacid to produce a polyester. The polyketone is in a single homogenous phase during the oxidation process and may be in either solid or liquid form.

In a preferred embodiment, a molten polyketone is contacted with an organic peroxyacid in a reactive extrusion process to produce polyester pellets.

12 Claims, No Drawings

PROCESS FOR CONVERTING POLYKETONES TO POLYESTERS WITH ORGANIC PEROXY ACID

BACKGROUND OF THE INVENTION

The present invention relates to the production of polyesters from polyketones.

Polyketones, i.e., polymers having carbonyl groups incorporated in the polymer chain, are known in the art and are most commonly produced by polymerizing carbon monoxide with one or more α-olefins. Polyketones of the type derived from ethylene and carbon monoxide were disclosed by Brubaker in U.S. Pat. No. 2,495,286. Numerous other liquid and gas phase procedures utilizing Ziegler and radical catalyst have been described in the prior art for polymerizing carbon monoxide with ethylene and other olefinically unsaturated monomers. A general review of the properties, preparations, reactions and uses of olefin-carbon monoxide copolymers can be found in the Encyclopedia of Polymer Science and Technology, Vol. 9, pp. 397–402, John Wiley & Sons, Inc. (1968).

Various procedures are known for the chemical modification of polyketones. U.S. Pat. No. 2,457,271 discloses a method for modifying monoolefin-carbon monoxide copolymers to increase the degree of unsaturation by heating the copolymer in a solution of an organic solvent with a minor amount of an alkaline metal hydroxide. The copolymer is reacted until the oxygen content is decreased by at least 5% or the iodine number increased to at least 25. Modification of polyketones (monoolefin-carbon monoxide copolymers) by reaction with hydrazine hydrate and related nitrogen-containing compounds is described in U.S. Pat. No. 2,457,279. A process for reacting polyketones with hydrogen cyanide to prepare polycyanohydrin resins is disclosed in U.S. Pat. No. 2,495,284.

U.S. Pat. No. 2,495,292 discloses the catalytic hydrogenation of monoolefin-carbon monoxide polymers in the presence of a nickel catalyst to reduce the carbonyl groups to secondary alcohol groups and obtain high molecular weight polyhydric alcohols. U.S. Pat. No. 2,846,406 relates to a process for reacting monoolefin-carbon monoxide copolymers with formaldehyde and specific ammonium or amine salts to produce polyamines of relatively high molecular weight. Another process for modifying monoolefin-carbon monoxide copolymers by reacting with hydrazoic acid in the presence of an acid catalyst is disclosed in U.S. Pat. No. 3,068,201.

Processes for producing thermoplastic polymers form polyketones are also disclosed in U.S. Pat. Nos. 3,979,373 and 3,979,374. The products of U.S. Pat. No. 3,979,373 are polymer furan derivatives obtained by reacting an equimolar alternate copolymer of ethylene and carbon monoxide with a strong acid, e.g. sulfuric, phosphoric, p-toluene sulfonic, etc., at 40° to 200° C. The polymeric pyrrollic polymers of U.S. Pat. No. 3,979,374 are obtained by reacting an equimolar alternate copolymer of ethylene and carbon monoxide with a primary monoamine in the presence of strong acid and a solvent at a temperature from 40°-100° C.

However, despite the variety of processes described above, the art as yet lacks a process that allows carbonyl groups incorporated into the polymer chain of a polyketone to be readily oxidized to ester groups.

U.S Pat. Nos. 4,929,711 and 4,957,997 to Chang et al. describe processes for converting polyketones to polyesters by reacting a polyketone with an organic peroxyacid oxidizing agent in an inert liquid medium. The conversions in these processes typically require over an hour to achieve desirable results. However, these processes are not practical from a commercial standpoint, because they cannot be readily adapted to mass production of polyesters.

SUMMARY OF THE INVENTION

Therefore, it is an object of the present invention to provide a process for converting polyketones to polyesters that can be practiced on a commercial scale.

It is another object of the invention to convert polyketones to polyesters in a minimum amount of time.

It is another object of the invention to convert polyketones to polyesters without substantially altering the molecular weight of polymer produced.

These and other objects of the invention are provided by a process in which a polyketone containing 0.01 to 50 mole percent carbonyl groups is contacted directly with an organic peroxyacid to produce a polyester. The polyketone is in a single homogenous phase during the oxidation process and may be a solid, melt or liquid.

In a preferred embodiment, a molten polyketone is contacted with an organic peroxyacid in a reactive extrusion process to produce polyester pellets.

DETAILED DESCRIPTION

In a preferred embodiment of the invention, the polyketone has a molecular weight from about 1,000 to 1,000,000 and a carbonyl content from 0.5 to 20 mole percent. Organic peroxyacids which are especially useful as oxidizing agents include chloro-, fluoro-, and carboxyl-substituted aromatic or aliphatic peroxyacids. These peroxyacids are particularly effective for the process when employed at molar ratios from about 0.1:1 to 30:1 (peroxyacid:carbonyl). The process can be used to convert polymers made from ethylene and carbon monoxide into the corresponding polyesters, including ethylene-carbon monoxide copolymers and terpolymers of ethylene, carbon monoxide and a $C_{3-8}$ α-olefin.

As employed herein, the term polyketone generally refers to polymers having a plurality of carbonyl

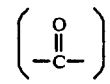

groups in the polymer chain. The carbonyl groups, sometimes also referred to herein as ketone or keto groups, may be randomly or uniformly distributed throughout the polymer chain.

The term polyester as used herein encompasses any polymer having one or more oxycarbonyl

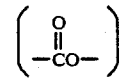

groups in the polymer chain. These polyesters will typically contain a plurality of oxycarbonyl groups, also referred to herein as ester groups. When less than all of the available carbonyl functionality of the polyketone is reacted, the polyesters will contain both oxycarbonyl and carbonyl groups. As will be apparent to those skilled in the art, a broad array of useful polyester products can therefore be produced by the present process. It is a highly desirable aspect of the present invention that by judicious selection of the process variables, it is possible to vary the composition of the resulting product with respect to the amount of carbonyl and oxycarbonyl groups for different applications.

While it is possible to obtain quantitative conversion of the carbonyl to oxycarbonyl groups, such a conversion is not necessary to practice this invention. Substantial amounts of carbonyl functionality may remain and be present in the resulting polyester product.

The polyketone polymers utilized for the preparation of the polyesters in accordance with process of the present invention comprise a hydrocarbon polymer chain having a plurality of carbonyl groups distributed throughout with the carbon atom of the carbonyl being part of the polymer chain. The polymer chain is comprised substantially entirely of carbon atoms. The carbonyl groups may be either randomly or uniformly distributed within the polymer molecule, i.e. along the polymer backbone. The polyketones can structurally be represented as being comprised of repeating units of the structural formula

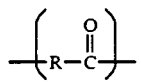

where R represents a bivalent hydrocarbon moiety.

The molecular weight of the polyketones can range from about 1,000 up to several million or more. It is possible to react extremely high molecular weight polyketones (up to 5 million) in accordance with the present process to convert all or a portion of the carbonyl functionality to ester functionality. Most commonly, the polyketones will have molecular weights from about 1,000 to 2,000,000 and, more particularly, from about 10,000 to up to about 1,000,000. The carbonyl content (% CO) of the polyketones will range form 0.01 mole percent up to about 50 mole percent. Most usually, carbonyl contents range from 0.5 mole percent up to about 20 mole percent.

The polyketones used can be obtained by any of the known procedures described in the art. The method of preparation of the polyketone plays no role in the process of the invention so long as the polyketone is substantially free of impurities, such as catalyst residues or the like, which might interfere with the oxidation reaction. While the polyketones are most advantageously prepared by the copolymerization of carbon monoxide and α-olefins, other procedures can be utilized. These include, for example, copolymerization of ethylene with aliphatic aldehydes at high temperature and pressure; oxidation of polyvinylalcohol or polyethylene; cationic polymerization of ketene or diketene; radical ring-opening polymerization of unsaturated cyclic ethers or diketene; and radical ring-opening polymerization of 2,2-diphenyl-4-methylene-1,3 dioxolane.

Copolymerization of carbon monoxide and α-olefins is most commonly utilized to produce the polyketones. Numerous procedures for preparation of these polymers are known and described in the prior art. The α-olefins which are used typically have from 2 to 12 carbon atoms and include aliphatic α-olefins, such as ethylene, propylene, 1-butene, isobutylene, 1-hexene, 1-octene, and α-olefins having aromatic substituents, such as styrene, p-methyl styrene, α-methyl styrene and the like. Polyketones obtained by the polymerization of carbon monoxide and ethylene or the polymerization of carbon monoxide, ethylene and a second α-olefin having from 3 to 8 carbon atoms, and particularly propylene, are most advantageously utilized in the present process.

The process of the present invention may also be advantageously used with other polymers having carbonyl groups present in the polymer chain and derived from one or more olefinically unsaturated monomers such as styrene; α-methylstyrene; α-olefins; acrylonitrile; acrylamide; vinyl chloride; vinylidene chloride; vinyl acetate; methyl vinyl ketone; vinylpyridine; acrylic acid and esters thereof; methacrylic acid and esters thereof; maleic anhydride and mono- and diesters thereof; and the like.

The physical characteristic of the resulting polyester are a function of the molecular weight, the molecular weight distribution of the polymer and the extent of conversion of carbonyl groups to oxycarbonyl groups. These in turn primarily depend on the composition of the polyketone, the reaction conditions, and the amount of oxidizing agent used.

The process of the invention may use a polyketone in any homogeneous phase, solid or liquid, but preferably uses a molten polyketone. Most preferably, the molten polyketone is present in an extruder-reactor, such as the one described in U.S. Pat. No. 4,501,859 to Newman et al.

An typical extruder-reactor used in the process of the invention has various operating zones such as a feed zone, a reaction zone, a wash zone and an exit zone. However, the invention can be practiced using various extruder configurations and is not limited to the type of extruder described below.

In the feed zone, the polyketone polymer is introduced into the extruder-reactor in a convenient form. This forms includes, for example, particles and pellets of plastic as they are produced commercially.

The feed zone is designed to form the polymer feed into a cohesive mass and to convey or pump the mass past a restrictive dam which follows the feed zone and distinguishes it from the reaction zone which follows. This operation should be conducted at low shear temperature consistent with the desired result and a pressure sufficient to convey the mass, typically up to about 350 kg/cm². Lower pressures are preferred in order to avoid overheating the polymer. This can be achieved by utilizing an extruder screw with relatively deep flights and by keeping the length of the feed zone, i.e., the feed zone screw length, as short as possible commensurate with desired production rates. For example, the polymer is introduced at about room temperature and is maintained at about 60° to 110° C.

A restrictive dam is used to separate the feed zone from the reaction zone which follows it so as to prevent back leakage reactants. This dam is not restrictive enough, however, to cause excessive overheating of the polymer. A restrictive dam can be, for example, a reverse flighted screw section, a filled screw section, a shallow flighted screw section, an unflighted screw section, combinations thereof, or other means known in the art. If an unflighted screw section is employed, it can have a larger diameter than the root diameter upstream of it. If a reverse flighted screw section is employed it can be single or multi-flighted, preferably multi-flighted.

The reaction zone can generally be described as the zone in which the oxidizing agent is caused to react with the polymer to completely effect the oxidation reaction while simultaneously minimizing undesired side reactions. Screw configuration in the reaction zone is important to mixing efficiency and achievement of the overall objectives of the process. The configuration should be such as to cause disruption of the flow of the polymer, as, for example, by the aforementioned use of reverse flights, multiple reverse flights, pin sections, a series of very short alternating reverse and forward screw sections, and other designs known in the art to improve mixing. Viscosity control of the polymer, effected, in part, by control of the molecular weight of the polymer and the polymer temperature as it enters the reaction zone, also determines, to a large extent, mixing efficiency. The temperature level of the reaction and the residence time in the reaction zone affect the nature of the end product. For maximum economy and continuity of production the choice of materials of construction of the reaction zone is particularly important; this also influences the type and level of potential contaminants in the finished polymer and their influence on long-term storage stability of the polymer as well as chemical reactivity.

The oxidizing agents used in the process of the invention are peroxyacids containing from 2 up to about 30 carbon atoms and correspond to the formula

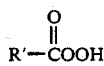

where R' is an aliphatic, cycloaliphatic or aromatic moiety which can be unsubstituted or substituted with one or more halo, nitro or carboxyl groups. When R' is aliphatic, i.e. an alkyl group, it will generally contain from 1 to 19 carbon atoms. When R' is cycloaliphatic, i.e., a cycloalkyl group, it will generally contain from 5 to 19 carbon atoms. When R' is aromatic, i.e. and aryl group, it will generally contain from 6 to 19 carbon atoms. Any of the above alkyl, cycloalkyl or aryl groups can contain halo-, nitro- or carboxyl-substituents. Chloro and fluoro groups are particularly advantageous halo substituents. In a particularly useful embodiment, the organic peroxyacid oxidizing agent is a chloro-, fluoro- or carboxyl-substituted aromatic or aliphatic peroxyacid. Peroxybenzoic acid, m-chloroperoxybenzoic acid, peroxyacetic acid, trifluoroperoxyacetic acid, monoperoxyphthalic acid and monoperoxymaleic acid are representative of the oxidizing agents which can be used. In choosing the reaction temperature, it is not only important to consider the melting temperature of the polyketone, but also the effect of higher temperatures on the stability of the organic peroxide.

The molar ratio of oxidizing agent based on the carbonyl functionality ranges from about 0.1:1 to 30:1 and, most preferably, from 0.5:1 to 5:1. This ratio represents the number of moles of oxidizing agent per mole of carbonyl group.

When a molten polyketone is oxidized, the reaction can be conducted at temperatures from about 60° C. to about 110° C. While the reaction time may vary depending on the polyketone used, the oxidizing agent used and the reaction temperature, it can range from 5 minutes under optimal or near optimal conditions up to 4 hours (240 minutes) or more where low reaction temperatures and/or low concentrations of reactants are used.

The reaction conditions and time of reaction will be selected based on the degree of conversion of carbonyl to oxycarbonyl desired. As previously pointed out, all or substantially all of the available carbonyl groups of the polyketone can be converted to ester moieties, if desired. However, since it is not necessary to achieve 100% conversion and, in certain instances, is advantageous to produce polyester products which contain generally conducted in such a way that only a portion of the keto functionality is converted to ester groups. This permits the use of reaction times and conditions which minimize or completely eliminate undesirable chain scission reactions.

After exiting the reaction zone of the extruder, the oxidized polymer is washed in a wash zone of the extruder. Typically, in the wash zone a stream or several streams of water are run countercurrent and/or concurrent to the flow of oxidized polymer so as to remove fluid and soluble non-polymer-bound materials, except water, from the polymer; some water may remain occluded in the polymer. In addition to water, the oxidized polymer may washed with salts such as sodium sulfite or sodium carbonate in order to neutralize any peroxyacid residues on the polymer.

After the wash zone, there is an exit zone from which the oxidized polymer is extruded in the form of a pellet or other article shape. After extrusion, the pellet is then allowed to cool.

While the above description relates to reacting the polyketone with the oxidizing agent in an extruder-reactor, the process of the invention also contemplates other ways of reacting an oxidizing agent directly with a polyketone. For instance, the oxidizing agent may be reacted with a liquid or molten polyketone without the use of an extruder. As in the extruder, the reaction temperature is preferably between about 60° C. and 110° C.

Further, the process of the invention contemplates reacting the oxidizing agent with a solid polyketone. In this case, the reaction temperature is between about 20° C. to about 90° C.

The invention will be further understood by reference to the following examples which describe a process demonstrating the principles of this invention.

EXAMPLE 1

10 g of a polyketone, ethylene-carbon monoxide copolymer resin powder, containing 17.9% carbonyl groups (MW 193,550, Mn 21,408) was treated with 11 g of m-chloroperoxybenzoic acid. The mole ratio of peroxyacid:carbonyl in the polyketone was approximately 1:1. The polyketone and oxidizing agent were allowed to react for 4 hours at 50° C. Analysis of the final product by infrared spectrometer and proton NMR indicated that it contained 13.4 mole % ester groups and 3.6 mole % carbonyl 10 groups.

EXAMPLE 2

5 g of a polyketone, ethylene-carbon monoxide copolymer resin powder, containing 7.4% carbonyl groups (MW 191,988, Mn 22,622) was treated with 2.2 g of m-chloroperoxybenzoic acid. The mole ratio of peroxyacid:carbonyl in the polyketone was approximately 1:1. The polyketone and oxidizing agent were allowed to react for 4 hours at 50° C. Analysis of the final product by infrared spectrometer and proton NMR indicated that it contained 4.1 mole % ester groups and 3.2 mole % carbonyl groups.

EXAMPLE 3

5 g of a polyketone, ethylene-carbon monoxide copolymer resin powder, containing 17.9% carbonyl groups (MW 193,550, Mn 21,408) was heated in a flask at 60° to 65° C. to melt the polyketone. 6 g of m-chloroperoxybenzoic acid was added to the flask and mixed with the polyketone. The mole ratio of peroxyacid:carbonyl in the polyketone was approximately 1:1. The polyketone and oxidizing agent were allowed to react for 1 hour at 70° to 75° C. Analysis of the final product by infrared spectrometer indicated that it contained 9.8 mole % ester groups and 6.6 mole % carbonyl groups.

EXAMPLE 4

5 g of a polyketone, ethylene-carbon monoxide copolymer resin powder, containing 7.4% carbonyl groups (MW 193,550, Mn 21,408) was heated in a flask at 70° to 75° C. to melt the polyketone. 2 g of m-chloroperoxybenzoic acid was added to the flask and mixed with the polyketone. The mole ratio of peroxyacid:carbonyl in the polyketone was approximately 1:1. The polyketone and oxidizing agent were allowed to react for 1 hour at 75° to 80° C. Analysis of the final product by infrared spectrometer indicated that it contained 4.7 mole % ester groups and 2.6 mole % carbonyl groups.

EXAMPLE 5

10 g of polyketone, ethylene-carbon monoxide copolymer resin powder containing 7.4% carbonyl groups (MW 193,550, Mn 21,408) was heated in a Brabender Reactor at 90° C. at 60 rpm. A mixture of 10 g of the same polyketone and 20 g of the m-chloroperoxybenzoic acid was added intermittently over 25 minutes. After addition the contents were stirred at 60 rpm for an additional 7 minutes. The product was then cooled to ambient temperature. Analysis by proton NMR indicated that the product contained 6.6 mole % ester groups.

What is claimed is:

1. A process for making a polyester comprising:
    contacting a solid or molten polyketone, having a molecular weight greater than 1,000 and containing 0.01 to 50 mole percent carbonyl groups, said carbonyl groups being present in the polymer chain, with an oxidizing agent comprising an organic peroxyacid at a temperature of about 20° C. to about 110° C. to produce a polyester, said organic peroxyacid having from 2 to 30 carbon atoms, the molar ratio of said oxidizing agent to carbonyl in said polyketone being from about 0.1:1 to 30:1 wherein said polyketone and said oxidizing agent are reacted for about five minutes to about 240 minutes.

2. The process of claim 1, wherein substantially all of the carbonyl groups of said polyketone are converted to ester moieties.

3. The process of claim 1, wherein the molar ratio of said oxidizing agent to carbonyl groups in said polyketone is from about 0.5:1 to about 5:1.

4. The process of claim 1, wherein said oxidizing agent comprises m-chloroperoxybenzoic acid.

5. A process for making a polyester comprising:
    heating a polyketone to a temperature of about 60° C. to about 110° C. to form a molten polymer, said polyketone having a molecular weight greater than 1,000 and containing 0.01 to 50 mole percent carbonyl groups; and
    contacting said molten polymer with an oxidizing agent comprising an organic peroxyacid to produce a molten polyester, said organic peroxyacid having from 2 to 30 carbon atoms, the molar ratio of said oxidizing agent to carbonyl in said polyketone being from about 0.1:1 to 30:1.

6. The process of claim 5, wherein substantially all of the carbonyl groups of said polyketone are converted to ester moieties.

7. The process of claim 5, wherein said molten polymer is contacted with said oxidizing agent in an extruder-reactor.

8. The process of claim 5, wherein the molar ratio of said oxidizing agent to carbonyl in said polyketone is from about 0.5:1 to about 5:1.

9. The process of claim 5, wherein said oxidizing agent comprises m-chloroperoxybenzoic acid.

10. The process of claim 1, wherein the reaction temperature is between 20° C. and about 90° C.

11. The process of claim 1, wherein the reaction temperature is between 60° C. and about 110° C.

12. The process of claim 1, wherein the reaction temperature is between 40° C. and about 110° C.

* * * * *